United States Patent
Fukaya

(10) Patent No.: US 10,389,176 B2
(45) Date of Patent: Aug. 20, 2019

(54) ELECTRONIC DEVICE

(71) Applicant: CANON KABUSHIKI KAISHA, Tokyo (JP)

(72) Inventor: Yudai Fukaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 15/331,225

(22) Filed: Oct. 21, 2016

(65) Prior Publication Data

US 2017/0126061 A1 May 4, 2017

(30) Foreign Application Priority Data

Oct. 29, 2015 (JP) .................................. 2015-213324

(51) Int. Cl.
| | |
|---|---|
| H01F 27/42 | (2006.01) |
| H01F 37/00 | (2006.01) |
| H01F 38/00 | (2006.01) |
| H02J 50/10 | (2016.01) |
| H02J 50/80 | (2016.01) |
| H02J 5/00 | (2016.01) |
| H04B 5/00 | (2006.01) |
| H04L 29/06 | (2006.01) |
| H04W 12/06 | (2009.01) |
| G06F 21/44 | (2013.01) |
| H02J 50/12 | (2016.01) |
| H02J 7/02 | (2016.01) |
| H02J 7/00 | (2006.01) |

(52) U.S. Cl.
CPC .............. *H02J 50/10* (2016.02); *G06F 21/44* (2013.01); *H02J 5/005* (2013.01); *H02J 50/12* (2016.02); *H02J 50/80* (2016.02); *H04B 5/0031* (2013.01); *H04B 5/0037* (2013.01); *H04L 63/0876* (2013.01); *H04W 12/06* (2013.01); *H02J 7/0042* (2013.01); *H02J 7/025* (2013.01); *H02J 2007/0001* (2013.01)

(58) Field of Classification Search
CPC . G06F 21/43; H02J 5/005; H02J 50/10; H02J 50/80; H02J 7/025; H04B 5/0031; H04B 5/0037; H04L 63/0876; H04W 12/06
USPC .......................................................... 307/104
See application file for complete search history.

(56) References Cited

U.S. PATENT DOCUMENTS

| | | | |
|---|---|---|---|
| 2010/0146308 A1* | 6/2010 | Gioscia | G06F 1/1632 713/300 |
| 2015/0077047 A1* | 3/2015 | Chen | H02J 7/025 320/108 |
| 2016/0087688 A1 | 3/2016 | Fukaya | |
| 2016/0087689 A1 | 3/2016 | Fukaya | |

FOREIGN PATENT DOCUMENTS

JP 2007-226486 A 9/2007

\* cited by examiner

*Primary Examiner* — Rexford N Barnie
*Assistant Examiner* — Toan T Vu
(74) *Attorney, Agent, or Firm* — Venable LLP

(57) ABSTRACT

An electronic device includes a housing, an antenna arranged in the housing, and a communication unit that communicates with an external device via the first antenna. A first part of the housing is formed with a conductive material, a second part of the housing has an opening is filled with an insulator, and the insulator is arranged to overlap the antenna.

11 Claims, 7 Drawing Sheets

SIDE VIEW
REAR VIEW
BOTTOM VIEW
SECTIONAL VIEW a : NO METAL LOOP
b : WITH METAL LOOP
c : METAL FORMS LOOP WHEN VIEWED FROM BOTTOM BUT NO CONTINUITY IN LOOP
d : NO METAL

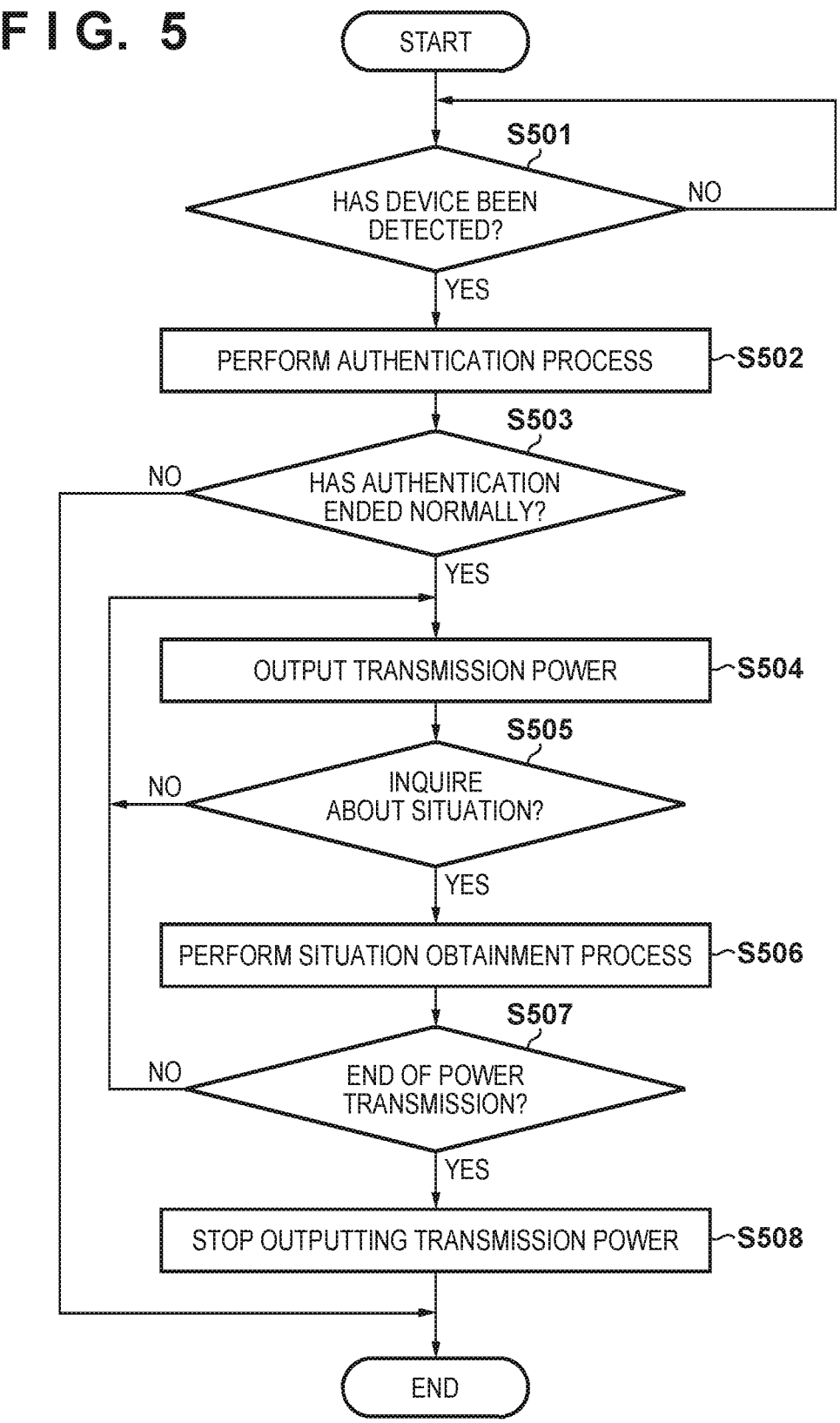

1

ELECTRONIC DEVICE

BACKGROUND

Field of the Invention

Aspects of the present invention relate to an electronic device capable of wireless power transmission, and a method of controlling wireless power transmission.

Description of the Related Art

There exist an electronic device that exchanges data by superimposing a signal on wirelessly transmitted power without physical connection via a connector, and an electronic device that performs power transmission to wirelessly charge a portable device. Such electronic devices each have a coil serving as an antenna for wireless power transmission, and can exchange data signals and power for charging when the antenna of the power-transmitting-side electronic device and the antenna of the power-receiving-side electronic device are in proximity to each other.

A case in which a metal is arranged around the antenna of the electronic device can be considered. For example, consider a case in which a conductive material such as a metal is used for the housing of the electronic device. If a metal is present around the antenna in this manner, it may influence the wireless power transmission. Japanese Patent Laid-Open No. 2007-226486 describes an arrangement which reduces the influence of a metal around the antenna. Japanese Patent Laid-Open No. 2007-226486 discloses an arrangement in which a metal frame that forms a closed loop is provided around the antenna in advance to prevent the influence from a new metal even if the new metal is arranged around the antenna. The influence in this case is the shifting of a transmission wave resonance frequency due to an external metal.

However, although the shifting of the transmission wave resonance frequency due to an external metal is reduced by the arrangement disclosed in Japanese Patent Laid-Open No. 2007-226486, the efficiency of power transmission with a partner electronic device may decrease because a closed loop metal frame is arranged around the antenna.

SUMMARY

According to an aspect of the present invention, an electronic device capable of efficient power transmission can be provided.

According to an aspect of the present invention, a method that enables efficient power transmission can be provided.

According to an aspect of the invention relates to an electronic device comprising a housing, an antenna arranged in the housing, and a communication unit that communicates with an external device via the first antenna, wherein a first part of the housing is formed with a conductive material, a second part of the housing has an opening is filled with an insulator, and the insulator is arranged to overlap the antenna.

Further features and aspects of the present invention will become apparent from the following description of exemplary embodiments.

BRIEF DESCRIPTION OF THE DRAWINGS

FIG. 5 is a flowchart illustrating an exemplary process performed in the power transmission apparatus 100;

DESCRIPTION OF THE EMBODIMENTS

Exemplary embodiments, features, and aspects of the present invention will be described below with reference to the drawings. However, aspects of the present invention are not limited to the following embodiments.

[First Embodiment]

Figure 1:
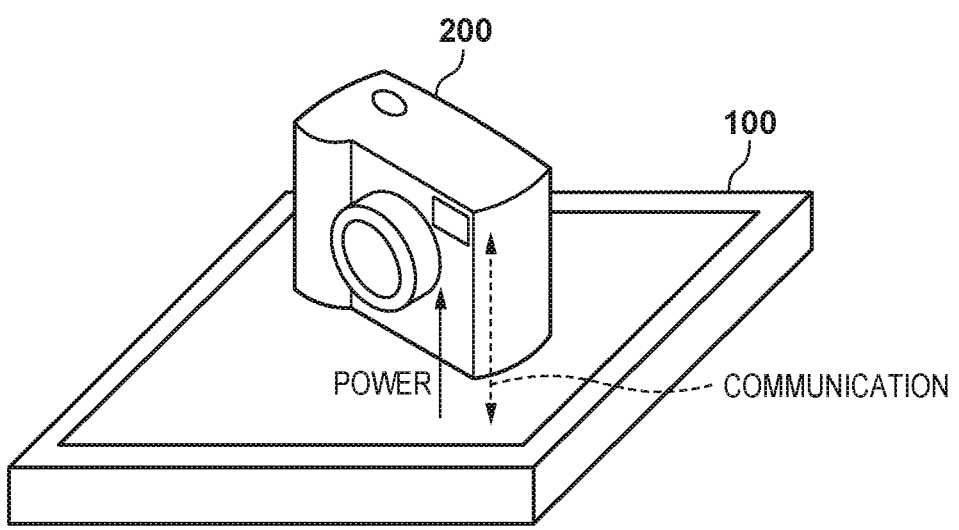
FIG. 1 is a view illustrating an arrangement of a power transmission system according to a first embodiment.

FIG. 1 is a view illustrating an example of an arrangement of a power transmission system according to the first embodiment. As shown in FIG. 1, the power transmission system according to the first embodiment includes a power receiving apparatus 200 and a power transmission apparatus 100. In the power transmission system, wireless power supply is performed from the power transmission apparatus 100 to the power receiving apparatus 200 along with data communication between the apparatuses.

Wireless power supply is performed when the power transmission apparatus 100 and the power receiving apparatus 200 are present within a predetermined range. The power transmission apparatus 100 performs wireless communication via a power transmission antenna (corresponding to a power transmission antenna 108 in FIG. 2) to determine whether the power receiving apparatus 200 is a device that can receive power. If the power transmission apparatus 100 determines that the power receiving apparatus 200 is a device which can receive power, it supplies power to the power receiving apparatus 200 by outputting power for power transmission via the power transmission antenna. The power receiving apparatus 200 wirelessly receives, via a power receiving antenna (corresponding to a power receiving antenna 201 in FIG. 2), the power output from the power transmission apparatus 100.

If the power transmission apparatus 100 and the power receiving apparatus 200 are not present within the predetermined range, the power transmission apparatus 100 outputs very weak power at predetermined intervals to detect the power receiving apparatus 200 within the predetermined range. Note that the predetermined range is a range in which the power receiving apparatus 200 can perform communication by power supplied from the power transmission apparatus 100.

Figure 2:
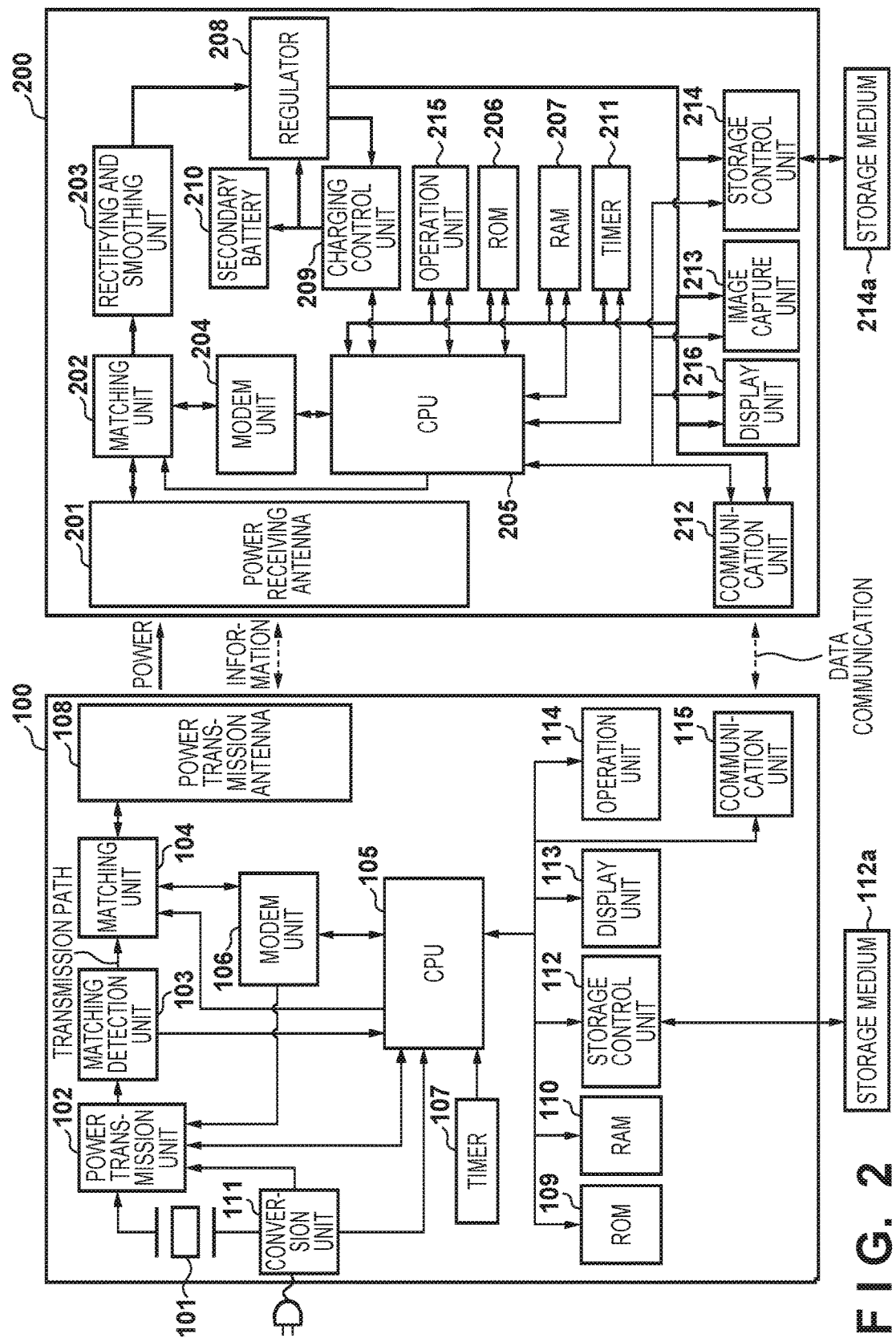
FIG. 2 is a block diagram illustrating components of a power transmission apparatus 100 and components of a power receiving apparatus 200.

The power receiving apparatus 200 may be a digital still camera, a mobile phone with a camera, or an image capture device such as a digital video camera or the like, as long as it is an electronic device that operates by power supplied from an internal secondary battery (corresponding to a secondary battery 210 in FIG. 2). In addition, the power receiving apparatus 200 may be a playback device such as a player that plays back audio data or image data.

FIG. 2 is a block diagram illustrating a hardware arrangement of the power transmission apparatus 100 and a hardware arrangement of the power receiving apparatus 200. First, components included in the power transmission apparatus 100 will be described with reference to FIG. 2.

As shown in FIG. 2, the power transmission apparatus 100 includes an oscillator 101, a power transmission unit 102, a matching detection unit 103, a matching unit 104, a CPU (central processing unit) 105, a modem unit 106, a timer 107, the power transmission antenna 108, a ROM (read-only memory) 109, a RAM (random access memory) 110, a conversion unit 111, a storage control unit 112, a display unit 113, an operation unit 114, and a communication unit 115. In addition, the storage control unit 112 can be arranged with a detachable storage medium 112*a*. Power is supplied from the outside to the power transmission apparatus 100 via an AC power supply 116.

The oscillator 101 converts power supplied from the AC power supply 116 via the conversion unit 111 into power corresponding to a target value set by the CPU 105, and oscillates a high frequency that is used to supply power to the power receiving apparatus 200. Note that the oscillator 101 uses a crystal oscillator, a crystal oscillation unit, or the like. The power transmission unit 102 generates power, which is to be supplied to the power receiving apparatus 200 via the power transmission antenna 108, according to power supplied from the conversion unit 111 and frequency oscillated by the oscillator 101. The power transmission unit 102 includes a field effect transistor (FET) or the like, and generates power, to be supplied to the power receiving apparatus 200, according to the frequency oscillated by the oscillator 101. If an FET (field effect transistor) is included, power can be controlled by controlling the current flowing between the source and drain terminals of the FET. Note that power generated by the power transmission unit 102 is supplied to the power transmission antenna 108 via the matching detection unit 103 and the matching unit 104.

First power and second power are types of power generated by the power transmission unit 102. The first power is power for the power transmission apparatus 100 to transmit a command to the power receiving apparatus 200 to control the power receiving apparatus 200. The second power is power larger than the first power. For example, the first power is power equal to or less than 1 W, and the second power is power of 1 W to 10 W.

Note that when the power transmission apparatus 100 is supplying the first power to the power receiving apparatus 200, the power transmission apparatus 100 can transmit a command to the power receiving apparatus 200. However, when the power transmission apparatus 100 is supplying the second power to the power receiving apparatus 200, the power transmission apparatus 100 cannot transmit a command to the power receiving apparatus 200. The first power is power set by the CPU 105 so that the power transmission apparatus 100 can transmit a command to any kind of device other than the power receiving apparatus 200.

The CPU 105 controls the power transmission unit 102 so that power to be supplied to the power receiving apparatus 200 can be switched to the first power or the second power.

The matching detection unit 103 measures voltages of the traveling wave of power generated in the power transmission unit 102 and the reflected wave from the power transmission antenna 108 to detect a voltage standing wave ratio. Here the voltage standing wave ratio (VSWR) is a numerical value that indicates the voltage relationship of the traveling wave and the reflected wave. The VSWR is calculated by $$VSWR=(1+\rho)/(1-\rho) \quad (1)$$

where ρ is calculated by $$\rho=(Z-Zo)/(Z+Zo)=Vr/Vf \quad (2)$$

where Z is a load impedance, Zo is a characteristic impedance of a transmission line, Vf is an amplitude voltage of a traveling wave, and Vr is an amplitude voltage of a reflected wave.

Whether impedance matching has been established can be known by detecting this VSWR. In a state in which impedance matching is established, the amplitude voltage of the reflected wave is zero, and VSWR is 1 because Z=Zo.

The matching unit 104 includes elements such as a variable capacitor, a variable coil, and a variable resistor. The matching unit 104 performs impedance matching of the impedance on the side of the matching detection unit 103 and the impedance on the side of the power transmission antenna 108. In addition, the matching unit 104 need not include all of the variable capacitor, the variable coil, and the variable resistor.

The matching unit 104 is a resonance unit that resonates, according to a frequency oscillated by the oscillator 101, between the power transmission antenna 108 and the power receiving antenna included in a device selected by the CPU 105. Note that the frequency for the power transmission apparatus 100 and the power receiving apparatus 200, which is the power transmission target device of the power transmission apparatus 100, to resonate will be called "resonance frequency f" hereinafter.

The relation of the resonance frequency f, an inductance L, and a capacitance C is shown by $$f=1/\{2\pi(LC)^{1/2}\} \quad (3)$$

where L is the inductance of the matching unit 104, and C is the capacitance of the matching unit 104.

In addition, the matching unit 104 may further include a capacitor other than the variable capacitor, a coil other than the variable capacitor, and a resistor other than a variable resistor.

Note that the CPU 105 controls the values of the variable capacitor and the variable coil to set the power, which is output from the power transmission antenna 108 in the frequency oscillated by the oscillator 101, to be the resonance frequency f. The resonance frequency f may be a commercial frequency of 50/60 Hz, a frequency of 10 to several hundred kHz, or a frequency of about 10 MHz.

When the AC power supply and the power transmission apparatus 100 are connected, the CPU 105 controls the components of the power transmission apparatus 100 by power supplied from the AC power supply via the conversion unit 111. The CPU 105 controls the components of the power transmission apparatus 100 by executing one or more computer programs stored in the ROM 109. The CPU 105 controls power supplied to the power receiving apparatus 200 by controlling the power transmission unit 102. The CPU 105 transmits a command to the power receiving apparatus 200 by controlling the modem unit 106.

The modem unit 106 modulates power generated by the power transmission unit 102 in accordance with a predetermined protocol to transmit, to the power receiving apparatus 200, a command to control the power receiving apparatus 200. The predetermined protocol is, for example, a communication protocol complying with ISO/IEC 18092 standard such as RFID (Radio Frequency IDentification). Power generated by the power transmission unit 102 is converted into a pulse signal by the modem unit 106 as a command for allowing communication with the power receiving apparatus 200, and the pulse signal is transmitted to the power receiving apparatus 200 via the power transmission antenna 108.

Alternatively, the predetermined protocol may be a communication protocol that is compatible with NFC (Near Field Communication) standard.

A pulse signal transmitted to the power receiving apparatus 200 is analyzed by the power receiving apparatus 200, and detected as bit data containing information of "1" and information of "0". Note that the command includes identification information for identifying a destination and a command code indicating an operation instructed by the command. Note that the CPU 105 can transmit a command to only the power receiving apparatus 200 by controlling the modem unit 106 so as to change the identification information included in the command. The CPU 105 can also transmit a command to the power receiving apparatus 200 and devices other than the power receiving apparatus 200 by controlling the modem unit 106 so as to change the identification information included in the command.

The modem unit 106 converts power generated by the power transmission unit 102 into a pulse signal by ASK (Amplitude Shift Keying) modulation using an amplitude shift. The ASK modulation is a modulation using an amplitude shift, and is used in communication between an IC card and a card reader that performs wireless communication with the IC card. The modem unit 106 changes the amplitude of power generated by the power transmission unit 102, by switching an analog multiplier and a load resistor included in the modem unit 106 to change the power into a pulse signal. The pulse signal changed by the modem unit 106 is provided to the power transmission antenna 108 and transmitted as a command to the power receiving apparatus 200. The modem unit 106 also modulates data encoded by the CPU 105 using a predetermined encoding method.

The modem unit 106 can demodulate, in accordance with the current flowing through the power transmission antenna 108 and detected by the matching unit 104, a response received from the power receiving apparatus 200 and corresponding to the command transmitted to the power receiving apparatus 200. As a result, the modem unit 106 can receive from the power receiving apparatus 200 the response corresponding to the command transmitted to the power receiving apparatus 200, by the load modulation method. The modem unit 106 transmits a command to the power receiving apparatus 200 in accordance with the instruction from the CPU 105. Additionally, when a response is received from the power receiving apparatus 200, the modem unit 106 demodulates the received response and supplies the demodulated response to the CPU 105.

The timer 107 measures the current time, and measures a time related to an operation or process performed in each component. The threshold for each time measured by the timer 107 is stored in the ROM 109 in advance.

The power transmission antenna 108 is an antenna for outputting, to the outside, power generated by the power transmission unit 102. The power transmission apparatus 100 supplies power and transmits a command during communication with the power receiving apparatus 200 via the power transmission antenna 108. Additionally, the power transmission apparatus 100 receives, in communication with the power receiving apparatus 200 via the power transmission antenna 108, a command, a response corresponding to the command transmitted to the power receiving apparatus 200, and information transmitted from the power receiving apparatus 200.

The ROM 109 stores one or more computer programs that control the components of the power transmission apparatus 100, and information such as parameters related to the components of the power transmission apparatus 100. The ROM 109 also stores image data (e.g., menu information) which is to be displayed on the display unit 113. The RAM 110 is a rewritable nonvolatile memory. The RAM 110 temporarily stores the one or more computer programs that control the components of the power transmission apparatus 100, information such as parameters related to the components, and information received from the power receiving apparatus 200 by the modem unit 106. When the AC power supply and the power transmission apparatus 100 are connected, the conversion unit 111 converts AC power supplied from the AC power supply into DC power, converts the converted DC power into an appropriate voltage value, and supplies it to the entire power transmission apparatus 100.

The storage control unit 112 stores data, such as image data or audio data, received by the communication unit 115 in the storage medium 112a. The storage control unit 112 can read out data, such as image data or audio data, from the storage medium 112a, and supply the readout data to the RAM 110, the communication unit 115, and the display unit 113. Although shown in the example of a detachable storage medium in FIG. 2, the storage medium 112a may be a hard disk, a memory card, or the like. The storage medium 112a may be incorporated in the power transmission apparatus 100 or be an external storage medium that can be detached from the power transmission apparatus 100.

The display unit 113 displays at least one image data out of image data read out from the storage medium 112a by the storage control unit 112, image data provided from the RAM 110, image data provided from the ROM 109, and image data provided from the communication unit 115. The display unit 113 can also display image data read out from the storage medium 112a, icons and menu screens stored in the ROM 109, or the like.

The operation unit 114 provides a user interface to operate the power transmission apparatus 100. The operation unit 114 includes a power button for operating the power transmission apparatus 100, a mode switching button for switching the operation mode of the power transmission apparatus 100, and a setting change button for changing the settings of the power transmission apparatus 100. Each button is comprised by a switch, a touch panel, or the like. The CPU 105 controls the power transmission apparatus 100 according to the instruction input by a user via the operation unit 114. Note that the operation unit 114 may be a target for controlling the power transmission apparatus 100 in accordance with a remote control signal received from a remote controller.

The communication unit 115 transmits image data or audio data received from the RAM 110 or the storage medium 112a to the power receiving apparatus 200. The communication unit 115 receives image data or audio data transmitted from the power receiving apparatus 200 to the power transmission apparatus 100.

For example, the communication unit 115 may perform communication in accordance with an interface such as a USB (Universal Serial Bus), an HDMI (High-Definition Multimedia Interface), or the like. The communication unit 115 may perform communication that conforms to the wireless communication method. Additionally, for example, the communication unit 115 may perform wireless communication in accordance with at least one of IEEE 802.11a, IEEE 802.11b, IEEE 802.11g, IEEE 802.11n, and Bluetooth standards. The communication unit 115 may transmit or receive image data or audio data by modulating the information into a signal conformed to one of wireless LAN standards.

Note that even in a case in which a command has been transmitted to the power receiving apparatus 200 via the power transmission antenna 108, the communication unit 115 can receive image data or audio data from the power receiving apparatus 200 and transmit image data or audio data to the power receiving apparatus 200. In addition, even in a case in which a response corresponding to the command has been received from the power receiving apparatus 200 via the power transmission antenna 108, the communication unit 115 can receive image data or audio data from the power receiving apparatus 200 and transmit image data or audio data to the power receiving apparatus 200. The power transmission apparatus 100 may have a loudspeaker unit. The loudspeaker unit can set, as an output target, audio data read out from the storage medium 112a by the storage control unit 112, audio data provided from the ROM 109, audio data provided from the RAM 110, or audio data provided from the communication unit 115.

When the power transmission apparatus 100 supplies power to the power receiving apparatus 200 via the power transmission antenna 108, the first power or the second power is output to the power receiving apparatus 200 by the power transmission unit 102, the matching unit 104, the modem unit 106, and the power transmission antenna 108. If the power transmission apparatus 100 is to transmit a command to the power receiving apparatus 200 via the power transmission antenna 108, the first power and the command are supplied to the power receiving apparatus 200 by the power transmission unit 102, the matching unit 104, the modem unit 106, and the power transmission antenna 108. If the power transmission apparatus 100 is to transmit at least one of image data and audio data to the power receiving apparatus 200, at least one of image data and audio data is transmitted to the power receiving apparatus 200 by the communication unit 115. If the power transmission apparatus 100 is to receive at least one of image data and audio data from the power receiving apparatus 200, at least one of image data and audio data is received from the power receiving apparatus 200 by the communication unit 115.

Note that, even in a case in which the communication apparatus 115 is transmitting at least one of image data and audio data, the power transmission apparatus 100 can transmit a command or information to the power receiving apparatus 200 via the power transmission antenna 108. Even in a case in which the communication unit 115 is transmitting at least one of image data and audio data to the power receiving apparatus 200, the power transmission apparatus 100 can receive a response corresponding to the command or information from the power receiving apparatus 200 via the power transmission antenna 108.

In addition, even in a case in which the communication unit 115 is receiving at least one of image data and audio data from the power receiving apparatus 200, the power transmission apparatus 100 can transmit a command or information to the power receiving apparatus 200 via the power transmission antenna 108. In addition, even if the communication unit 115 is receiving at least one of image data and audio data from the power receiving apparatus 200, the power transmission apparatus 100 can receive a response corresponding to the command or information from the power receiving apparatus 200 via the power transmission antenna 108.

Next, components included in the power receiving apparatus 200 will be described with reference to FIG. 2. Note that a case in which an electronic device which can act as a digital camera is arranged as the power receiving apparatus 200 will be described in the first embodiment. However, the power receiving apparatus 200 can be formed by another electronic device. For example, an electronic device that can act as a mobile phone, a smartphone, or a tablet terminal can be formed as the power receiving apparatus 200.

The power receiving apparatus 200 includes the power receiving antenna 201, a matching unit 202, a rectifying and smoothing unit 203, a modem unit 204, a CPU (central processing unit) 205, a ROM (read only memory) 206, a RAM (random access memory) 207, a regulator 208, a charging control unit 209, the secondary battery 210, and a timer 211. The power receiving apparatus 200 further includes a communication unit 212, an image capture unit 213, a storage unit 214, a storage medium 214a, an operation unit 215, and a display unit 216.

The power receiving antenna 201 is an antenna for receiving power supplied from the power transmission apparatus 100 in the communication between the power transmission apparatus 100 and the power receiving apparatus 200. The power receiving apparatus 200 can, via the power receiving antenna 201, receive power or a command from the power transmission apparatus 100. In addition, the power receiving apparatus 200 transmits, via the power receiving antenna 201, a command to control the power transmission apparatus 100 and a response corresponding to the command received from the power transmission apparatus 100.

The matching unit 202 is a component to perform impedance matching of the power receiving antenna 201, the modem unit 204, and the rectifying and smoothing unit 203. The matching unit 202 is a component that allows the power receiving antenna 201 to resonate in the same frequency as the resonance frequency f of the power transmission apparatus 100. The matching unit 202 includes, in the same manner as the matching unit 104, a capacitor, a coil, a variable capacitor, a variable coil, and a resistor. The matching unit 202 controls the capacitance value of the variable capacitor, the inductance value of the variable coil, and the impedance value of the variable resistor so that the power receiving antenna 201 will resonate in the same frequency as the resonance frequency f of the power transmission apparatus 100. The matching unit 202 also supplies power, received by the power receiving antenna 201, to the rectifying and smoothing unit 203.

The rectifying and smoothing unit 203 generates DC power from the AC power received by the power receiving antenna 201. Additionally, the rectifying and smoothing unit 203 supplies the generated DC power to the regulator 208. The rectifying and smoothing unit 203 supplies, to the modem unit 204, the command removed from the power received by the power receiving antenna 201. Note that the rectifying and smoothing unit 203 has a rectifier diode and generates DC power by full-wave rectification or half-wave rectification.

The modem unit 204 includes a diode wave detection unit comprising a diode, a capacitor, and a resistor. The modem unit 204 performs envelope detection of detecting the change in power supplied from the matching unit 202 as voltage change, and sends a detected envelope signal to the CPU 205. The CPU 205 receives the detected envelope signal from the matching unit 202, analyzes the command from the power transmission apparatus 100 in accordance with a communication protocol predetermined with the power transmission apparatus 100, and interprets the command from the power transmission apparatus 100. The modem unit 204 also sends, to the power transmission apparatus 100 via the power receiving antenna 201, predetermined information and a response corresponding to the command received from the power transmission apparatus 100, by applying load modulation according to a control signal from the CPU 205. If the load included in the modem unit 204 is changed, the current flowing through the power transmission antenna 108 is changed. As a result, the power transmission apparatus 100 can receive from the power receiving apparatus 200 the predetermined information and the response corresponding to the command transmitted to the power receiving apparatus 200, by detecting change in the current flowing through the power transmission antenna 108.

The CPU 205 analyzes the correspondence between a specific command and the command included in the signal received from the modem unit 204 in accordance with the modulation signal provided from the modem unit 204, and controls the power receiving apparatus 200 so that the process or operation designated by the command code corresponding to the received command will be performed. In addition, the CPU 205 executes one or more computer programs stored in the ROM 206 to control the components of the power receiving apparatus 200.

The ROM 206 stores one or more computer programs for controlling the components of the power receiving apparatus 200, and parameters related to the components. The ROM 206 also stores the identification information of the power receiving apparatus 200 used by the power transmission apparatus 100 and the power receiving apparatus 200 to authenticate each other, the device information of the power receiving apparatus 200, and the display data. The identification information of the power receiving apparatus 200 is, for example, information indicating the ID of the power receiving apparatus 200 and information indicating the address of the power receiving apparatus 200 for communication. The device information of the power receiving apparatus 200 includes the name of the manufacturer of the power receiving apparatus 200, the apparatus name of the power receiving apparatus 200, and the date of manufacture of the power receiving apparatus 200.

The RAM 207 is a rewritable nonvolatile memory. The RAM 207 temporarily stores the one or more computer programs that control the components of the power receiving apparatus 200, information such as parameters related to the components of the power receiving apparatus 200, and information transmitted from the power transmission apparatus 100.

The regulator 208 performs control so that the voltage of power supplied from the rectifying and smoothing unit 203 and the voltage of power supplied from the secondary battery 210 will be fixed voltage values that operate the system. Note that the regulator 208 may be a switching regulator or a linear regulator. In a case in which power is not supplied from the secondary battery 210 but is supplied from the rectifying and smoothing unit 203, the regulator 208 supplies the power from the rectifying and smoothing unit 203 to the entire power receiving apparatus 200.

In a case in which power is not supplied from the rectifying and smoothing unit 203 but is supplied from the secondary battery 210, the regulator 208 supplies power supplied from the secondary battery 210 to the entire power receiving apparatus 200 other than the charging control unit 209. In a case in which power is supplied from the rectifying and smoothing unit 203 and the secondary battery 210, the regulator 208 can supply power supplied from rectifying and smoothing unit 203 and the secondary battery 210 to the entire power receiving apparatus 200 other than the charging control unit 209.

In a case in which power is supplied from the rectifying and smoothing unit 203 to the regulator 208, the charging control unit 209 charges the secondary battery 210 in accordance with the supplied power. Note that charging control unit 209 is an object that charges the secondary battery 210 by a constant voltage/constant current method as rapid charging. The charging control unit 209 performs charging by power smaller than that of rapid charging until the battery changes from an empty state to a predetermined voltage.

The secondary battery 210 is a secondary battery detachable from the power receiving apparatus 200. The secondary battery 210 is also a rechargeable battery and is, for example, a lithium ion secondary batter or the like. The secondary battery 210 can supply power to the components of the power receiving apparatus 200. The timer 211 measures the current time, and measures a time related to an operation or process performed in each component. The threshold for the time measured by the timer 211 is stored in the ROM 206 in advance.

The communication unit 212 can transmit image data or audio data stored in the ROM 206 or the storage medium 214a to the power transmission apparatus 100. The communication unit 212 can receive image data or audio data from the power transmission apparatus 100. The communication unit 212 transmits/receives image data or audio data in accordance with a communication protocol shared with the communication unit 115. For example, the communication unit 212 may transmit/receive image data or audio data in accordance with IEEE 802.11a, b, g, or n standard defined for wireless LAN.

The image capture unit 213 includes an image sensor for generating image data from an optical image of an object, an image processing unit that performs image processing on the image data generated by the image sensor, and a compression/decompression unit that compresses the image data and decompresses the compressed image data. The image capture unit 213 captures an image of the object, and supplies a still image or a moving image obtained by image capturing to the storage unit 214.

The storage unit 214 stores, in the storage medium 214a, the image data provided from the image capture unit 213. The image capture unit 213 may further include arrangements necessary for capturing an image of the object.

The storage unit 214 stores data, such as image data or audio data, provided from the communication unit 212 or the image capture unit 213 in the storage medium 214a.

The storage unit 214 can read out data, such as image data or audio data, from the storage medium 214a, and supply the readout data to the RAM 207 and the communication unit 212.

Note that the storage medium 214a may be a hard disk or a memory card, may be incorporated in the power receiving apparatus 200, or may be an external storage medium detachable from the power receiving apparatus 200.

The operation unit 215 provides a user interface for operating the power receiving apparatus 200. The operation unit 215 includes a power button for operating the power receiving apparatus 200, and a mode switching button for switching the operating mode of the power receiving apparatus 200. Each button is comprised by a switch, a touch panel, or the like. The CPU 205 controls the power receiving apparatus 200 in accordance with the user instruction input via the operation unit 215. Note that the operation unit 215 may be the target to control the power receiving apparatus 200 in accordance with a remote control signal received from a remote controller. The display unit 216 is a display device such as a liquid crystal or organic electro-luminescence (EL). The display unit 216 can display a captured image stored in the storage medium 214a, and display a live view image from the image capture unit 213.

Note that the power transmission antenna 108 and the power receiving antenna 201 may be a helical antenna, a spiral antenna, or a planar antenna such as a meander line antenna. In the first embodiment, processes performed by the power transmission apparatus 100 are applicable to a system in which the power transmission apparatus 100 wirelessly supplies power to the power receiving apparatus 200 by electromagnetic coupling. In the first embodiment, processes performed by the power receiving apparatus 200 are also applicable to a system in which the power transmission apparatus 100 wirelessly supplies power to the power receiving apparatus 200 by electromagnetic coupling.

The first embodiment can be also applied in a system in which an electrode is provided as the power transmission antenna 108 in the power transmission apparatus 100, an electrode is provided as the power receiving antenna 201 in the power receiving apparatus 200, and power is supplied from the power transmission apparatus 100 to the power receiving apparatus 200 by electric field coupling.

The first embodiment is also applicable to a system in which the power transmission apparatus 100 wirelessly supplies power to the power receiving apparatus 200 by electromagnetic inductance.

Note that, in the first embodiment and the other embodiments, the power transmission apparatus 100 wirelessly transmitted power to the power receiving apparatus 200 and the power receiving apparatus 200 wirelessly received power from the power transmission apparatus 100. However, in the first embodiment and the other embodiments, "wireless" may be called "contactless" or "non-contact".

Figure 3A:
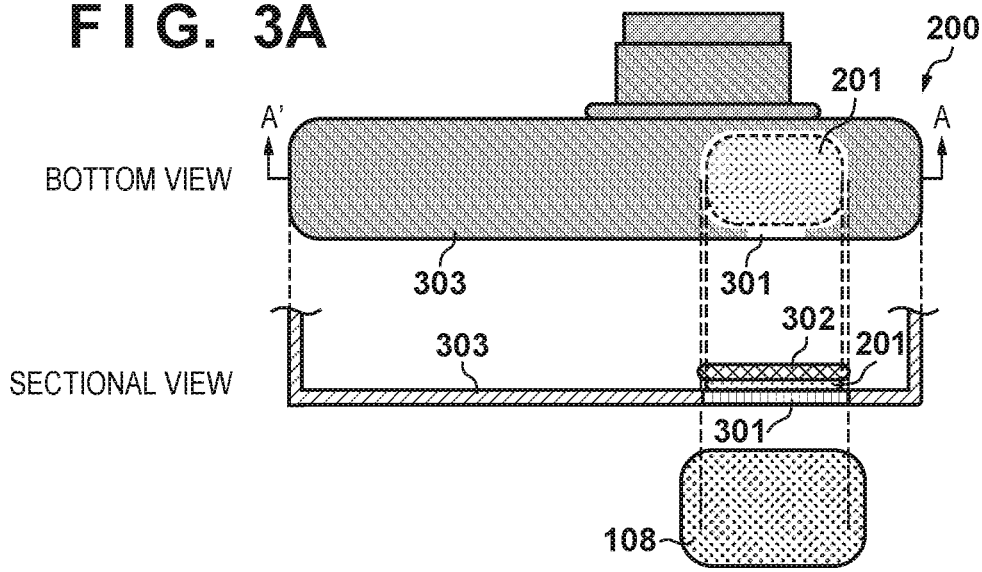
FIGS. 3A, 3B, and 3C are views illustrating an arrangement related to a power receiving antenna 201 of the power receiving apparatus 200.
Figure 3B:
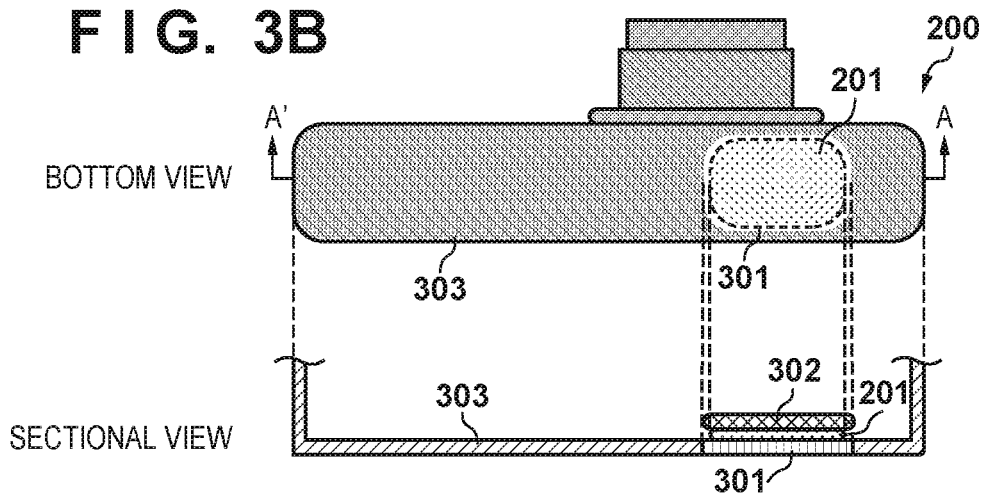

Next, examples of the shape of the conductive material around the antenna of the power receiving apparatus 200 will be described with reference to FIGS. 3A, 3B, and 3C. FIG. 3A is a view illustrating an arrangement of a case in which the conductive material around the power receiving antenna 201 of the power receiving apparatus 200 does not form a closed loop. The upper side of FIG. 3A is a bottom view showing an example of the bottom face of the power receiving apparatus 200. The lower side is a sectional view showing an example of the bottom structure of a section taken along a line A-A' in the bottom view, around the power receiving antenna 201 inside the power receiving apparatus 200. In addition, the power transmission antenna 108 is shown for comparison.

First, as shown in FIG. 3A, the power receiving antenna 201 is arranged on the bottom face side of the power receiving apparatus 200. This is because an example in which the power receiving apparatus 200 performs power reception on the power transmission apparatus 100 has been adopted in the first embodiment, and the power receiving antenna 201 can be provided at an arbitrary position in accordance with the communication direction of the power receiving apparatus 200. The bottom face of the power receiving apparatus is formed to include a mold 301 and a conductive material 303. The conductive material 303 can be, for example, a metal such as aluminum. For the sake of simplicity, the conductive material 303 is called the metal 303.

The mold 301 is surrounded by the metal 303 and may have an outer shape corresponding to the outer shape (along the outer shape) when the power receiving antenna 201 is viewed from the bottom face side. The mold 301 has an outer shape which is at least larger than the shape when viewed from the bottom face side of the power receiving antenna 201. The mold 301 is arranged to cover the power receiving antenna 201. The mold 301 is represented as a white region inside the metal 303 in FIG. 3A. The conductivity of the mold 301 is lower than the conductivity of the metal 303, is electronically insulated, and may be formed by, for example, an insulator such as a plastic or rubber.

In the first embodiment, the bottom face of the power receiving apparatus 200 is placed, as shown in FIG. 1, in the proximity to the front face of the power transmission apparatus 100, and the power receiving antenna 201 of the power receiving apparatus 200 is arranged to face, via the mold 301, the power transmission antenna 108 of the power transmission apparatus 100. Here, the metal 303 around the power receiving antenna 201 is formed not to be a loop (not form a closed loop) by using the mold 301. In the example shown in FIG. 3A, the contour of the mold 301 is formed along the periphery of the power receiving antenna 201, and a part of the contour is formed to protrude further outside the periphery. Due to the portion protruding outside (to be called "protruding portion" hereinafter), the mold 301 can have an outer shape in which a part of the loop contour line is protruding. The shape of this protruding portion is not limited to the mode shown in FIG. 3A as long as it is a shape in which the metal 303 does not form a closed loop. Although FIG. 3A shows an example in which the protruding portion is provided on a side opposite to the lens of the power receiving apparatus 200, the position of the protruding portion is not limited to that shown in FIG. 3A and may be another position. In addition, the number of provided protruding portions is not limited to one as shown in FIG. 3A, and protruding portions may be provided.

Next, the structure in FIG. 3A will be described from the side of the metal 303. A loop or circumferential opening is provided in the metal 303 and the opening is filled with the mold 301. Additionally, the continuity of the loop is blocked by the mold 301 in at least one location on the side of the opening, and the opening provided on the metal 303 does not form a closed loop.

As shown in the sectional view of FIG. 3A, the power receiving antenna 201 is arranged to be sandwiched between the mold 301 and a magnetic material 302. The power receiving antenna 201 is arranged further inside the housing than the mold 301, and the magnetic material 302 of a size corresponding to (the same size or a larger size than) the outer shape of the power receiving antenna 201 is arranged even further inside. The material of the magnetic material is ferrite or the like. The magnetic material is arranged so as to block the power transmission output from the power transmission apparatus 100 and prevent the power output from reaching inside the power receiving apparatus 200.

As shown in FIG. 3A, the power transmission antenna 108 may be a larger size than the power receiving antenna 201. For example, in an arrangement in which the power receiving antenna 201 and the power transmission antenna 108 face each other, the power receiving antenna 201 is covered by the power transmission antenna 108, and the mold 301 is also covered by the power transmission antenna 108. In this case, if the opening in the bottom portion of the power receiving apparatus 200 is forming a closed loop, it can affect the power transmission efficiency. Hence, in the first embodiment, the continuity of the loop in the opening is blocked by the mold 301 as the insulator.

Figure 4A:
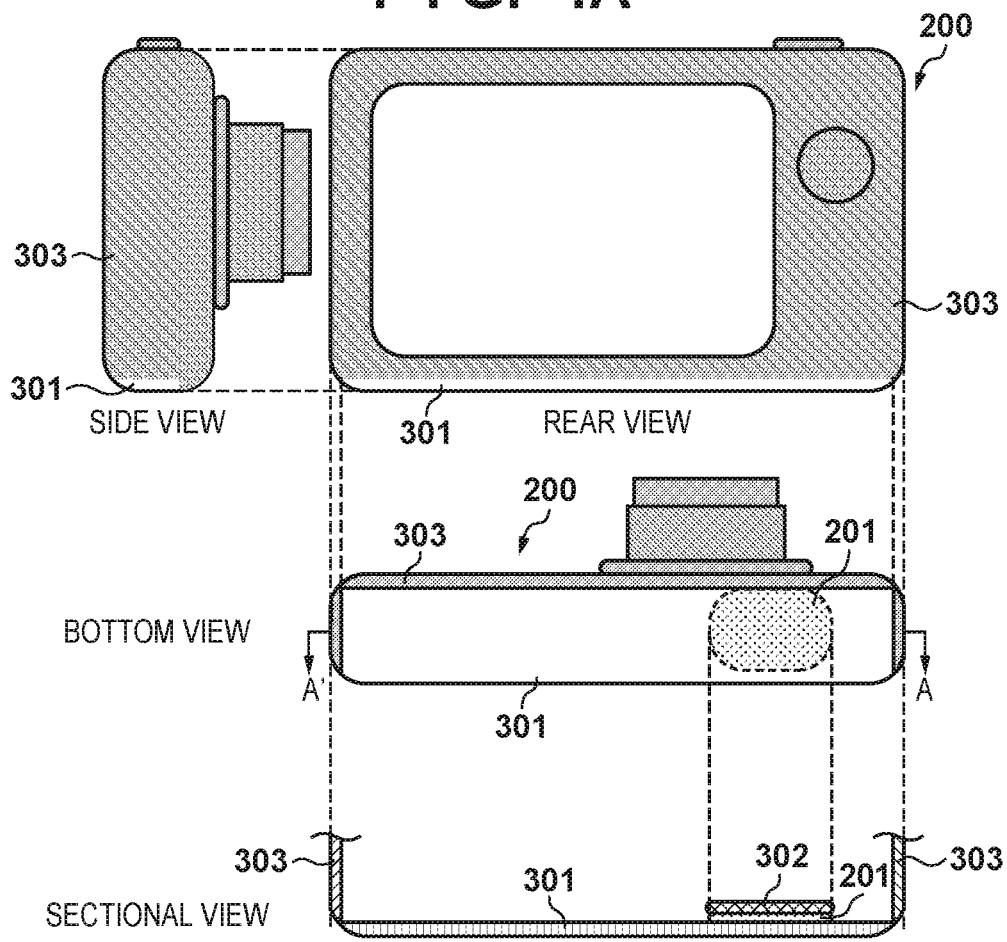
FIG. 4A is a view illustrating a modified arrangement related to the power receiving antenna 201 of the power receiving apparatus 200.

Although an example in which the mold 301 is provided in the vicinity of the power receiving antenna 201 has been shown in FIG. 3A, the region to form the mold 301 is not limited to the region in the vicinity of the power receiving antenna 201. For example, as shown in FIG. 4A, the bottom face including the power receiving antenna 201 may be so formed as to be almost entirely covered by the mold 301. The mold 301 may be so formed as to be exposed on the rear face side or the side face side of the power receiving apparatus 200. In FIG. 4A, the mold 301 near the bottom face of the rear face of the power receiving apparatus 200 is continuous with the side face and the bottom face and so extends as to cover the bottom of the power receiving antenna 201. Even in this case, the metal 303 forming the bottom face of the power receiving apparatus 200 does not form a closed loop in the direction of the power transmission apparatus 100.

Next, a case in which the metal around the power receiving antenna 201 of the power receiving apparatus 200 forms a closed loop will be described with reference to FIG. 3B. The main difference in the arrangement of the power receiving apparatus 200 in FIG. 3A and that in FIG. 3B is that a closed loop of the metal 303 has been formed by the mold 301 (the white region of the bottom face) around the power receiving antenna 201 shown in the bottom view of FIG. 3B.

Figure 3C:
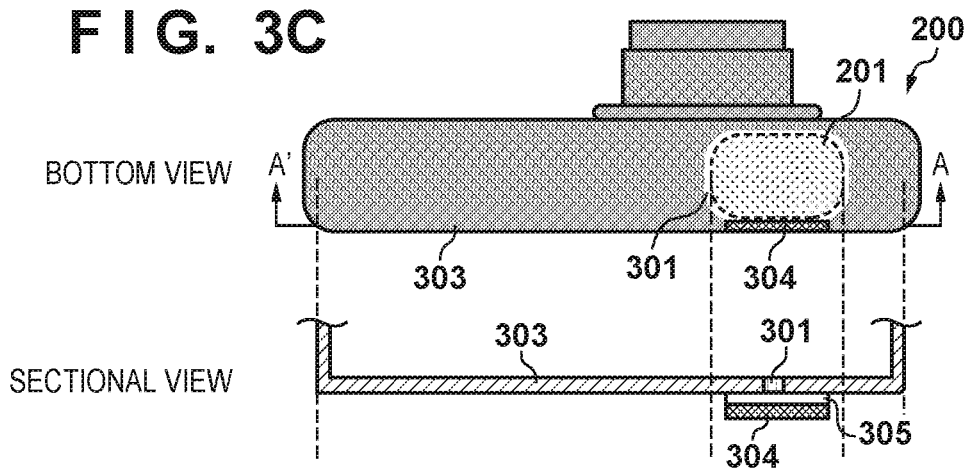

FIG. 3C shows an example in which a closed loop seems to be formed, when viewed from the bottom face side, by the metal 303 around the power receiving antenna 201 of the power receiving apparatus 200, but the metal 303 is actually insulated in the middle. As in the bottom view shown in the upper side of FIG. 3C, the bottom face of the housing of the power receiving apparatus 200 is formed by the metal 303, a conductive member 304, and the mold 301. The conductive member 304 may be formed by the same conductive material as the metal 303 or by a different conductive material. The metal 303 and the conductive member 304 will be called the metal A and the metal B, respectively, hereinafter. The mold 301 is formed around the power receiving antenna 201. The mold 301 is at least larger than the outer shape of the power receiving antenna 201 when viewed from the bottom face side. The mold 301 is arranged to cover the power receiving antenna 201. The mold 301 is represented as a white region inside the metal A 303 in FIG. 3C. In FIG. 3C, it can be regarded that a closed loop is formed by the metal A 303 and the metal B 304 when viewed from the bottom face.

When viewed from the bottom face side, a metal closed loop seems to be formed on the power receiving apparatus 200. However, in the cross section of A-A', the continuity of the loop is blocked by the mold 301 in the opening of the metal A 303. As a result, the opening provided in the metal A 303 does not form a closed loop. The opening is filled with the mold 301. In addition, the metal B 304 is so formed as to cover the mold 301, and the metal A 303 and the metal B 304 are attached or bonded by an insulating member 305. The insulating member 305 may be a predetermined a bonding member or an adhesive member. Hence, the metal A 303 and the metal B 304 do not directly come into contact with each other and are electrically insulated. The metal B 304 and the insulating member 305 may be integrally formed as a metal foil seal. As a result, the cutout portion formed on the metal A 303 can be less conspicuous on the bottom face of the power receiving apparatus 200.

Figure 4B:
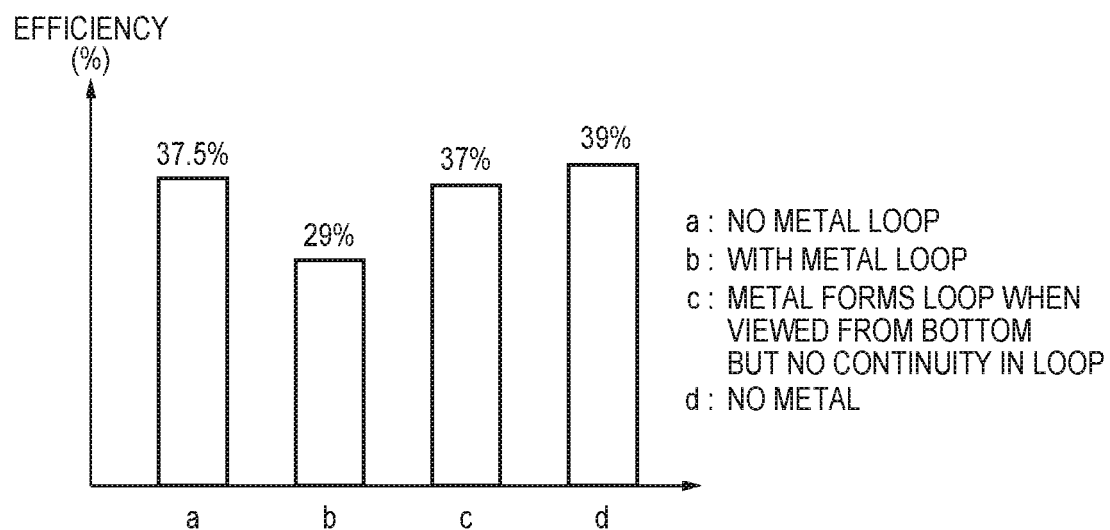
FIG. 4B is a bar graph illustrating an example of a power transmission efficiency measurement result.

The measurement result of power transmission efficiency for each arrangement of the power receiving apparatus 200 shown in FIGS. 3A to 3C will be described with reference to FIG. 4B. FIG. 4B shows an example of the result of measuring the power transfer efficiency when power transmission is performed upon placing the power receiving apparatus 200 on the power transmission apparatus 100, as shown in FIG. 1, and the power transmission antenna 108 and the power receiving antenna 201 are arranged to face each other.

The abscissa of FIG. 4B indicates the 4 cases "a", "b", "c", and "d" related to the arrangement of the power receiving apparatus 200, and the ordinate indicates an example of the power transmission efficiency. Case "a" corresponds with FIG. 3A and represents the result of a case in which no metal loop is formed around the power receiving antenna 201. Case "b" corresponds with FIG. 3B and represents the result of a case in which a metal loop is formed around the power receiving antenna 201. Case "c" corresponds with FIG. 3C and represents the result of a case in which the metal A 303 and the metal B 304 seem to form a metal loop when viewed from the bottom face of the power receiving apparatus 200 but the metal A 303 and the metal B 304 are actually insulated by the insulating member 305. Case "d" corresponds with a case in which no metal is present around the antenna. In this case, the housing is, for example, formed from not a metal but a mold.

In the result shown in FIG. 4B, the power transmission efficiency is 39% for case "d" in which no metal is used and has the best efficiency in comparison with the other cases. The power transmission efficiencies were 37.5% and 37% in the respective cases "a" and "c" arranged not to form a closed loop around the power receiving antenna 201, and the attenuation is small even when compared to the power efficiency of 39%. However, in case "b" in which a closed loop is formed, the attenuation increases to 29%, and only power transmission efficiency which is about 70% of that of case "d" can be obtained.

As described above, in the first embodiment, in a case in which a metal is arranged around the power receiving antenna 201 and the metal forming the power receiving apparatus 200 is arranged around the transmission antenna 108 at the time of power transmission, no metal closed loop is formed around the power receiving antenna 201 of the power receiving apparatus 200. Particularly, the arrangement has at least one location which is a low-conductivity location (for example, an electrically insulated location). Hence, even in a case in which a conductive material is used in the housing of the power receiving apparatus 200, highly efficient power transmission is possible.

Next, an exemplary process performed in power transmission apparatus 100 will be described with reference to FIG. 5. For example, the exemplary process is performed by the CPU 105 executing one or more computer programs stored in the ROM 109 to control the components of power transmission apparatus 100.

In step S501, the CPU 105 of the power transmission apparatus 100 detects the proximity of devices present around itself. In the first embodiment, a case in which the power receiving apparatus 200 is detected as a peripheral device will be described. The power transmission apparatus 100 outputs, via the power transmission antenna 108, a request signal for proximity confirmation at each predetermined interval, and detects the proximity of the power receiving apparatus based on whether a response signal to the request signal has been transmitted from the power receiving apparatus 200.

If the proximity of the power receiving apparatus 200 is detected (YES in step S501), the CPU 105 performs an authentication process in step S502. The CPU 105 outputs, as the authentication process, an authentication request signal to the power receiving apparatus 200, and receives an authentication response signal from the power receiving apparatus 200.

In step S503, the CPU 105 determines the result of the authentication process in step S502. If the authentication response signal received from the power receiving apparatus 200 has predetermined contents, the CPU 105 determines that the authentication has succeeded (YES in step S503), and advances to step S504. On the other hand, if the received response signal did not have the predetermined contents, the CPU 105 determines that the authentication has failed (NO in step S503), and ends the exemplary process.

In step S504, the CPU 105 outputs the transmission power via the power transmission antenna 108 in the subsequent step S504. The CPU 105 increases the output level of the power transmission unit 102 to increase the power output from the antenna as the transmission power.

In step S505, the CPU 105 determines whether it is the timing to inquire the power receiving apparatus 200 of the situation. If it is not the timing to inquire of the power receiving apparatus about the situation (NO in step S505), the power transmission is continued. If it is the timing to inquire of the power receiving apparatus about the situation (YES in step S505), the CPU 105 advances to step S506.

In step S506, the CPU 105 decreases the transmission power output from the power transmission antenna 108 as a situation obtainment process, transmits a situation inquiry signal (inquiry signal) to the power receiving apparatus 200, and waits to receive a response signal from the power receiving apparatus 200. If the response signal is received from the power receiving apparatus 200, the CPU 105 analyzes the contents of the received response signal and determines the situation of the power receiving apparatus 200. Here, the information obtained from the power receiving apparatus 200 is information about the excess and shortage of transmission power, the remaining charge amount of the secondary battery of the power receiving apparatus 200, or the like.

In step S507, the CPU 105 determines whether to end the power transmission based on the response signal received from the power receiving apparatus 200 in step S506. For example, the CPU 105 may determine to end the power transmission if an end request signal is included in the response signal from the power receiving apparatus 200. The CPU 105 may obtain information about whether the secondary battery 210 of the power receiving apparatus 200 is fully charged, and determine to end the power transmission if the secondary battery is fully charged. If the CPU 105 determines not to end the power transmission (NO in step S507), the CPU 105 returns to step S504, and output power is increased again to output the transmission power. On the other hand, if the CPU 105 determines to end the power transmission process (YES in step S507), the CPU 105 advances to step S508.

In step S508, the CPU 105 completely stops outputting the transmission power, and ends the exemplary process.

Figure 6:
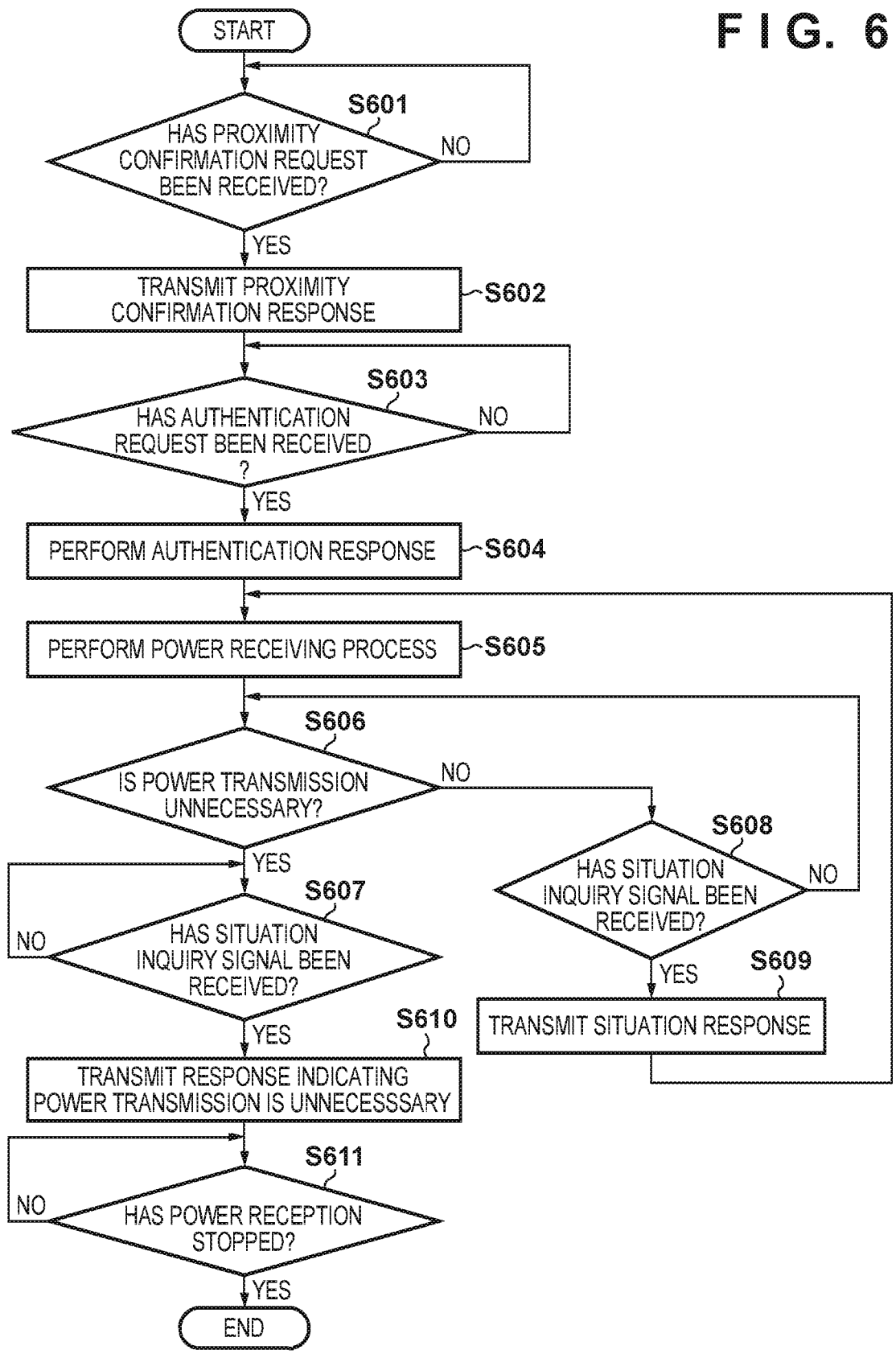
FIG. 6 is a flowchart illustrating an exemplary process performed in the power receiving apparatus 200.

Next, an exemplary process performed in the power receiving apparatus 200 will be described next with reference to FIG. 6. For example, the exemplary process is performed by the CPU 205 executing one or more computer programs stored in the ROM 206 to control the components of the power receiving apparatus 200.

In step S601, the CPU 205 of the power receiving apparatus 200 determines whether a proximity confirmation request signal has been received from the power transmission apparatus 100 via the power receiving antenna 201. If the CPU 205 receives the proximity confirmation request signal (YES in step S601), the CPU 205 advances to step S602.

In step S602, the CPU 205 transmits a proximity confirmation response signal to the power transmission apparatus 100 via the power receiving antenna 201, and the CPU 205 advances to step S603.

In step S603, the CPU 205 determines whether an authentication request signal has been received from the power transmission apparatus 100. If the CPU 205 receives the authentication request signal from the power transmission apparatus 100 (YES in step S603), the CPU 205 advances to step S604.

In step S604, the CPU 205 performs an authentication response process. The authentication response process can be performed, for example, by reading out the authentication response data stored in ROM 206 and transmitting the data as an authentication response signal to the power transmission apparatus 100.

In step S605, the CPU 205 starts a power receiving process. The power receiving process is performed by, for example, converting transmission power received from the power transmission apparatus 100 via the power receiving antenna 201 into DC power via the matching unit 202 and rectifying and smoothing unit 203, and regulating the DC power to a predetermined voltage via the regulator 208 to supply power to the power receiving apparatus 200.

In step S606, the CPU 205 determines whether output of transmission power is necessary based on each situation during the power receiving process. The determination is implemented based on, for example, the fact that the CPU 205 specifies the state of the battery of the secondary battery 210 via the charging control unit 209 and on whether the secondary battery is fully charged. If the secondary battery 210 is fully charged, power transmission can be determined to be unnecessary. If the CPU 205 determines that power transmission is unnecessary (YES in step S606), the CPU 205 advances to step S607. Otherwise (NO in step S606), the CPU 205 advances to step S608.

In step S608, the CPU 205 determines whether an inquiry signal has been received from the power transmission apparatus 100. Upon receiving the inquiry signal (YES in step S608), the CPU 205 advances to step S609. In this case, since power transmission has already been determined to be not unnecessary (necessary) in step S606, the CPU 205 responds only about the situation of the power receiving apparatus 200 to the power transmission apparatus 100 in step S609. Subsequently, the CPU 205 returns to step S606.

In step S607, the CPU 205 determines whether an inquiry signal has been received from the power transmission apparatus 100. Upon receiving the inquiry signal (YES in step S607), the CPU 205 advances to step S610. In this case, since power transmission has already been determined to be unnecessary in step S606, the CPU 205 transmits the end request signal to the power transmission apparatus 100 to respond to the power transmission apparatus 100 that power transmission is unnecessary in step S610.

In step S611, the CPU 205 determines whether it has stopped receiving reception power. The determination is performed by, for example, detecting the level of the DC voltage output from the rectifying and smoothing unit 203. When the CPU 205 determines that it has stopped receiving the reception power (YES in step S611), the CPU 205 ends the exemplary process.

The electronic devices of the first embodiment (i.e., the power transmission apparatus 100 and power receiving apparatus 200) can perform power transmission by executing the above-described exemplary processes. In this case, as shown in FIGS. 3A and 3C, highly efficient power transmission can be performed by arranging the conductive material around the antenna so as not to form a closed loop.

[Second Embodiment]

In the first embodiment, in a layout in which the power receiving antenna 201 and the power transmission antenna 108 face each other, a case in which the power receiving antenna 201 is covered by the power transmission antenna 108 and the mold 301 is also covered by the power transmission antenna 108 has been described. In the first embodiment, the continuity of the loop in the opening is blocked by the insulator so the metal closed loop will not be formed in the range covered by the power transmission antenna 108. In contrast, the second embodiment will describe an embodiment in which the area around the power receiving antenna 201 is formed so a metal which forms the power receiving apparatus 200 will not be arranged in the range of the power transmission antenna 108.

The basic arrangement of a power transmission system according to the second embodiment is the same as those in FIGS. 1 and 2. In the second embodiment, the power transmission apparatus 100 performs the exemplary process that has been described in the first embodiment with reference to FIG. 5, and the power receiving apparatus 200 performs the exemplary process that has been described in the first embodiment with reference to FIG. 6. Therefore, in the second embodiment, it will be described that the portion which is different from the first embodiment.

Another example of the shape of metal around the antenna of the power receiving apparatus 200 will be described below with reference to FIG. 7. In an arrangement shown in FIG. 7, a metal 303 forming the housing of the power receiving apparatus 200 has an opening in the bottom face of the power receiving apparatus 200, and the opening forms a closed loop. However, the shape of the closed loop does not conform to the outer shape of the power receiving antenna 201 of the power receiving apparatus 200 as shown in FIG. 3A, and the width of the closed loop is larger than the width of the power receiving antenna 201. The opening in the second embodiment can have, in a layout in which the power transmission antenna 108 and the power receiving antenna 201 are facing each other, a size that covers the range in which the power transmission antenna 108 may be positioned. As a result, power transmission is not prevented even if the opening on the bottom face of the power receiving apparatus 200 forms a closed loop.

Figure 7:
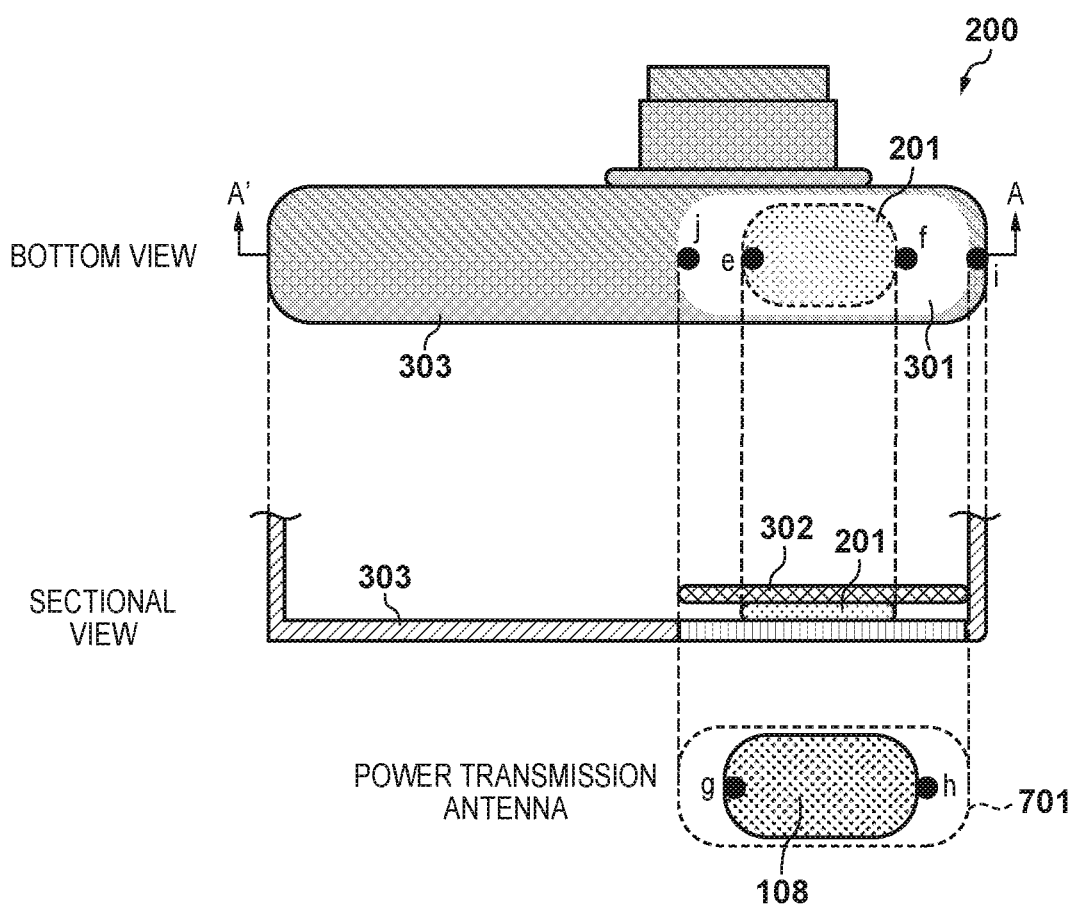
FIG. 7 is a view illustrating an arrangement related to a power receiving antenna 201 of a power receiving apparatus 200 according to a second embodiment.

The upper side of FIG. 7 is a bottom view showing an example of the bottom face of the power receiving apparatus 200. As shown in the bottom view, the power receiving antenna 201 is arranged on the bottom face side of the power receiving apparatus 200. The bottom face of the power receiving apparatus is arranged so as to include a mold 301 and the metal 303 which forms the region other than the mold 301. The mold 301 is at least larger than the outer shape when the power receiving antenna 201 is viewed from the bottom face side and is so arranged as to cover the power receiving antenna 201.

The middle of FIG. 7 is a sectional view taken along line A-A' of the bottom view and shows an example of the bottom structure around the power receiving antenna 201 inside the power receiving apparatus 200. As shown here, the power receiving antenna 201 is so arranged as to be sandwiched by the mold 301 and a magnetic material 302. The power receiving antenna 201 is arranged further inside the housing than the mold 301, and the magnetic material 302 which has an outer shape corresponding to the outer shape of the mold 301 is arranged even further inside. The material of the magnetic material is ferrite or the like. The magnetic material is arranged so as to block the power transmission output from a power transmission apparatus 100 and prevent the power output from reaching inside the power receiving apparatus 200.

The lower side of FIG. 7 is a view illustrating the positional relationship between the power transmission antenna 108 of the power transmission apparatus 100 and the power receiving antenna 201 of the power receiving apparatus 200. The dotted line around the power transmission antenna 108 represents the movable range of the power receiving apparatus 200. For example, the position of point h of the power transmission antenna 108 is at point i of the camera when point e of the power receiving antenna 201 comes to point g of the power transmission antenna 108. Similarly, the position of point g of the power transmission antenna 108 is at point j of the power receiving apparatus 200 when point f of the power receiving antenna comes to the position of point h of the power transmission antenna 108. In this manner, a range 701 represented by a dotted line is the movable range of the power receiving apparatus 200. In addition, the size of the mold 301 in the bottom view of FIG. 7 corresponds with the movable range 701 of the power receiving apparatus 200 and matches the movable range 701 as an example. By setting the mold 301 to have such a size, in a layout in which the power transmission antenna 108 and the power receiving antenna 201 are facing each other, the opening portion of the metal 303 forming the power receiving apparatus 200 will not overlap with the power transmission antenna 108 wherever the power transmission antenna 108 may be positioned. Hence, even in a case in which the opening on the bottom face of the power receiving apparatus 200 forms a closed loop, power transmission will not be obstructed.

In the second embodiment, the size of the opening on the bottom face of the power receiving apparatus 200 is determined in accordance with the movable range 701 of the power receiving apparatus 200. The movable range 701 is defined by a position at which the power transmission antenna 108 may include the power receiving antenna 201. In the second embodiment, the size of the opening (the size of the mold 301) of the bottom face of the power receiving apparatus 200 can be determined so as not to form a metal closed loop in the range where the power transmission antenna 108 is positioned. The metal 303 positioned outside the power transmission antenna 108 has little influence on the power transmission efficiency of the power transmission apparatus 100 and the power receiving apparatus 200. Hence, unlike the first embodiment, formation of a closed loop on the bottom face of the power receiving apparatus 200 can be tolerated in the second embodiment.

As described above, the second embodiment has, in the positional relationship between the power transmission antenna 108 and the power receiving antenna 201 at the time of communication, an arrangement in which no metal is arranged around the power receiving antenna 201 in the range where the power transmission antenna 108 may be positioned. As a result, the influence of the closed loop on the bottom face of the power receiving apparatus 200 can be suppressed, and electronic devices (i.e., the power transmission apparatus 100 and power receiving apparatus 200) which perform highly efficient power transfer can be provided.

Although a case in which the external housing is formed from a conductive material has been described in the first and second embodiments, an aspects of the present invention is also applicable to a case in which the mold is used for the outside of the power receiving apparatus 200 and a metal is used for the internal frame.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-213324, filed Oct. 29, 2015 which is hereby incorporated by reference herein in its entirety.

What is claimed is:

1. An electronic device comprising:
a housing;
an antenna that wirelessly receives power from an external device, the antenna being arranged in the housing; and
a communication unit that communicates with the external device,
wherein a part of the housing is formed with a conductive material and has an opening portion,
wherein a part of an outer edge of the conductive material is formed with a part of an outer edge of the opening portion,
wherein the opening portion is filled with an insulator,
wherein the insulator is arranged to cover the antenna, and
wherein the antenna is arranged between the insulator and a magnetic material.

2. The electronic device according to claim 1, wherein the part of the housing is a bottom face of the electronic device.

3. The electronic device according to claim 1, wherein the antenna is arranged further inside the housing than the insulator.

4. The electronic device according to claim 1, wherein the insulator includes a plastic or rubber.

5. The electronic device according to claim 1, wherein the magnetic material includes a ferrite material.

6. The electronic device according to claim 1, wherein a width of the opening potion is larger than a width of the antenna.

7. The electronic device according to claim 1, wherein the electronic device is powered by a battery.

8. The electronic device according to claim 1, further comprising a charging unit that charges a battery using power wirelessly received from the external device.

9. The electronic device according to claim 1, wherein the electronic device is capable of acting as a digital camera.

10. The electronic device according to claim 1, wherein the electronic device is capable of acting as a mobile phone or a smartphone.

11. The electronic device according to claim 1, wherein the electronic device is capable of acting as a tablet device.

* * * * *